(12) United States Patent
Bridges et al.

(10) Patent No.: US 9,091,529 B2
(45) Date of Patent: Jul. 28, 2015

(54) GRATING-BASED SCANNER WITH PHASE AND PITCH ADJUSTMENT

(75) Inventors: Robert E. Bridges, Kennett Square, PA (US); Ryan Kruse, Waltham, MA (US); Paul McCormack, Carlisle, MA (US); Emmanuel Lafond, Tewksbury, MA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 541 days.

(21) Appl. No.: 13/544,069

(22) Filed: Jul. 9, 2012

(65) Prior Publication Data

US 2013/0016190 A1    Jan. 17, 2013

Related U.S. Application Data

(60) Provisional application No. 61/507,771, filed on Jul. 14, 2011.

(51) Int. Cl.
| | | |
|---|---|---|
| *H04N 13/02* | (2006.01) | |
| *G01B 11/03* | (2006.01) | |
| *G01B 11/25* | (2006.01) | |

(52) U.S. Cl.
CPC ............ *G01B 11/03* (2013.01); *G01B 11/2527* (2013.01); *G01B 11/2536* (2013.01)

(58) Field of Classification Search
None
See application file for complete search history.

(56) References Cited

U.S. PATENT DOCUMENTS

| | | |
|---|---|---|
| 3,762,809 A | 10/1973 | Kato et al. |
| 4,017,727 A | 4/1977 | Yamamoto |
| 5,870,191 A | 2/1999 | Shirley et al. |
| 6,040,910 A | 3/2000 | Wu et al. |
| 6,438,272 B1 | 8/2002 | Huang et al. |
| 6,549,730 B1 | 4/2003 | Hamada |
| 6,690,474 B1 | 2/2004 | Shirley |

(Continued)

FOREIGN PATENT DOCUMENTS

| | | |
|---|---|---|
| DE | 10321888 A1 | 12/2004 |
| EP | 1944569 A1 | 7/2008 |

(Continued)

OTHER PUBLICATIONS

International Preliminary Report on Patentability for International Application Serial No. PCT/US2012/045361. International filing date Jul. 14, 2011. Date of Issuance Jan. 14, 2014.

(Continued)

*Primary Examiner* — Sath V Perungavoor
*Assistant Examiner* — Janese Duley
(74) *Attorney, Agent, or Firm* — Cantor Colburn LLP

(57) ABSTRACT

A method for determining three-dimensional coordinates of an object point on a surface of an object, the method including steps of: sending a beam of light to a diffraction grating; sending a first diffracted beam and a second diffracted beam to an objective lens to form at least two spots of light, which are passed through transparent regions of a plate to produce a first fringe pattern on the surface of the object; imaging the object point illuminated by the first fringe pattern onto a photosensitive array to obtain a first electrical data value; moving the plate to a second position; sending spots through plate to produce a second fringe pattern on the surface of the object; imaging the point onto the array point to obtain a second electrical data value; and calculating the three-dimensional coordinates of the first object point.

7 Claims, 11 Drawing Sheets

(56) References Cited

U.S. PATENT DOCUMENTS

| | | |
|---|---|---|
| 6,768,589 B2 | 7/2004 | Deutsch et al. |
| 6,909,105 B1 | 6/2005 | Heintzmann et al. |
| 6,985,308 B1 | 1/2006 | Smith et al. |
| 7,046,410 B2 | 5/2006 | Deutsch et al. |
| 7,139,128 B2 | 11/2006 | Smith et al. |
| 7,196,789 B2 | 3/2007 | Senturia et al. |
| 7,379,241 B2 | 5/2008 | Smith |
| 7,505,641 B1 | 3/2009 | Senturia et al. |
| 7,595,892 B2 | 9/2009 | Judell et al. |
| 7,751,063 B2 | 7/2010 | Dillon et al. |
| 7,763,841 B1 | 7/2010 | McEldowney |
| 7,791,027 B2 | 9/2010 | McAllister et al. |
| 2002/0163573 A1 | 11/2002 | Bieman et al. |
| 2003/0052607 A1 | 3/2003 | Paquette |
| 2003/0072011 A1 | 4/2003 | Shirley |
| 2004/0081441 A1 | 4/2004 | Sato et al. |
| 2004/0125205 A1 | 7/2004 | Geng |
| 2005/0002677 A1 | 1/2005 | McAllister et al. |
| 2008/0180693 A1 | 7/2008 | Dillon et al. |
| 2009/0257063 A1 | 10/2009 | Smith et al. |
| 2010/0008588 A1 | 1/2010 | Feldkhun et al. |
| 2010/0182311 A1 | 7/2010 | Kim |
| 2010/0290060 A1 | 11/2010 | Mohazzab et al. |
| 2011/0043876 A1 | 2/2011 | Kurashige et al. |
| 2012/0262550 A1 | 10/2012 | Bridges |
| 2012/0262573 A1 | 10/2012 | Bridges |

FOREIGN PATENT DOCUMENTS

| | | |
|---|---|---|
| EP | 2157455 A1 | 2/2010 |
| JP | 2001127852 A | 5/2001 |
| JP | 2002013919 A | 1/2002 |
| JP | 2002090126 A | 3/2002 |
| JP | 2006258438 A | 9/2006 |
| WO | 2006107929 A1 | 10/2006 |
| WO | 2010021972 A1 | 2/2010 |
| WO | 2010096062 A1 | 8/2010 |
| WO | 2010096634 A1 | 8/2010 |

OTHER PUBLICATIONS

International Preliminary Report on Patentability for International Application Serial No. PCT/US2012/045908. International filing date Jul. 9, 2012. Date of Issuance Jan. 14, 2014.

International Preliminary Report on Patentability for International Application Serial No. PCT/US2012/045909. International filing date Jul. 9, 2012. Date of Issuance Jan. 14, 2014.

Hornbeck, L.J., Digital Light Processing for High-Brightness, High-Resolution Applications, Texas Instruments Inc., Digital Video Operations, Dallas, Texas, Electronic Imaging, EI '97 Projection Displays III, Co-Sponsored by IS&T and SPIE, An Invited Paper, Feb. 10-12, 1997, San Jose, California.

Hornbeck, L.J., Digital Light Processing and MEMS: Timely Convergence for a Bright Future, Plenary Session, SPIE Micromachining and Microfabrication '95, Austin, Texas (Oct. 24, 1995). Color reprint available from Texas Instruments Digital Imaging Group, 214-995-2426.

Frankowski, G., DLP-Based 3D Metrology by Structured Light or Projected Fringe Technology for Life Sciences and Industrial Metrology, GFMesstechnik GmbH, Germany, Proc. SPIE Photonics West 2009.

VLSI Membrane Mirror Light Modulator for Multi-spectral Scene Projectors, Optron Systems, Inc., Public Release Number AFFTC PA 08430, http://www.optronsystems.com/html/technology_mems.htm. [Retrieved Jul. 12, 2012].

Frankowski, G., et al., Real-time 3D Shape Measurement with Digital Stripe Projection by Texas Instruments Micromirror Devices DMD, GFMesstechnik GmbH, Warthestr. 21, D-14513 Teltow/Berlin, Proc. of SPIE—vol. 2958 (2000), pp. 90-106.

Rusinkiewicz, Szymon, et al., Real-Time 3D Model Acquisition, ACM Transactions on Graphics, (Proc. SIGGRAPH), Jul. 2002, http://gfx.cs.princeton.edu/pubs/Rusinkiewicz_2002_R3M/index.php, [Retrieved Jul. 11, 2012].

Texas Instruments, Using Lasers with DLP DMD Technology, Lasers & DLP, TI DN 2509927, Copyright Sep. 2008, Texas Instruments Incorporated.

Geng, Jason. "Structured-Light 3D Surface Imaging: A Tutorial", Advances in Optics and Photonics, vol. 3, No. 2, Mar. 31, 2011, p. 128, XP55033088, DOI: 10.1364/A0P.3.000128, the whole document.

International Search Report of the International Searching Authority for Application No. PCT/US2012/035931; Date of Mailing Jul. 26, 2012.

Written Opinion of the International Searching Authority for Application No. PCT/US2012/035931; Date of Mailing Jul. 26, 2012.

International Preliminary Report on Patentability for International Application Serial No. PCT/US2012/035931. International filing date May 1, 2012. Date of Issuance Nov. 5, 2013.

International Search Report of the International Searching Authority for Application No. PCT/US2012/045361; Date of Mailing Oct. 22, 2012.

International Search Report of the International Searching Authority for Application No. PCT/US2012/045908; Date of Mailing Oct. 8, 2012.

International Search Report of the International Searching Authority for Application No. PCT/US2012/045909; Date of Mailing Oct. 8, 2012.

Swanson, G., et al., High-Precision Surface Profiling with Broadband Accordion Fringe Interferometry, Proceedings of SPIE, vol. 4189, Feb. 12, 2001; pp. 161-169, XP55038933, ISSN: 0277-786X, DOI: 10.1117/12.417193 the whole document.

Written Opinion of the International Searching Authority for Application No. PCT/US2012/045909; Date of Mailing Oct. 8, 2012.

Written Opinion of the International Searching Authority for Application No. PCT/US2012/045361; Date of Mailing Oct. 22, 2012.

Written Opinion of the International Searching Authority for Application No. PCT/US2012/045908; Date of Mailing Oct. 8, 2012.

Georgia Tech. (Apr. 11, 2011). Trimensional 3D Scanner iPhone app. [Video file]. Retrieved from https://www.youtube.com/watch?v=a3IQcF2jO8k.

TOP VIEW

SIDE VIEW

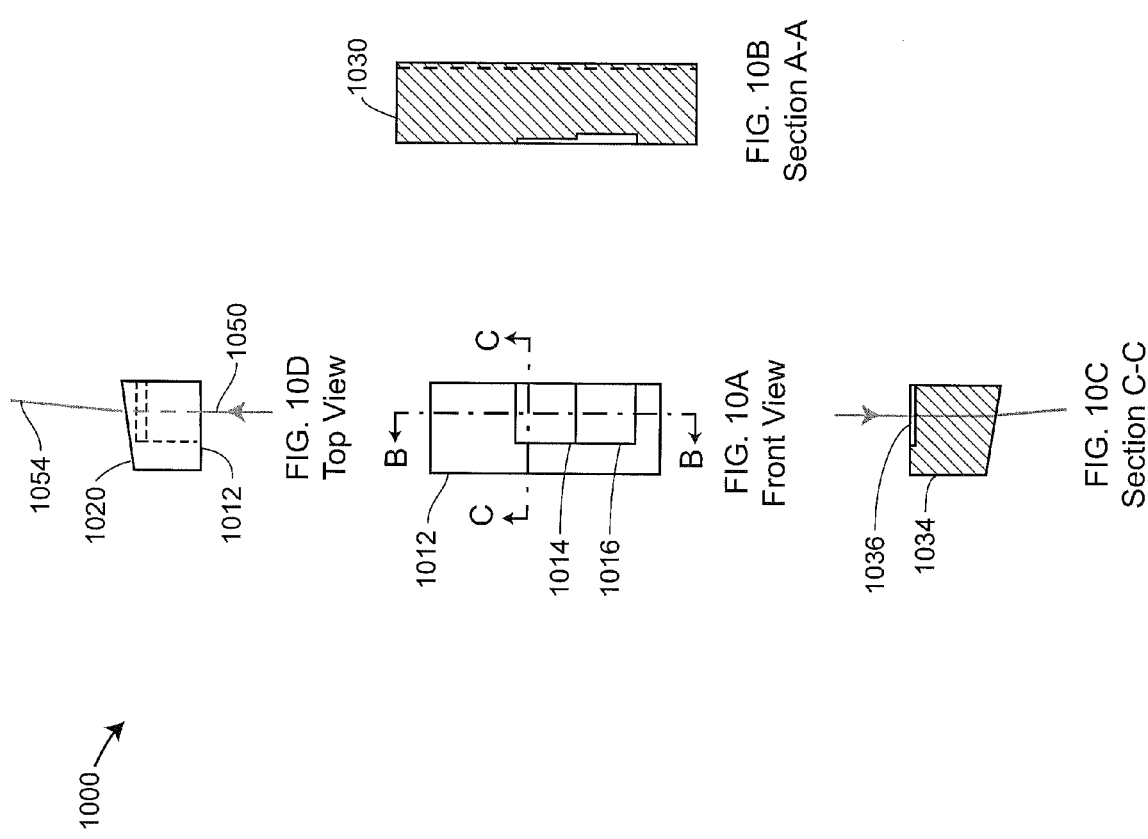

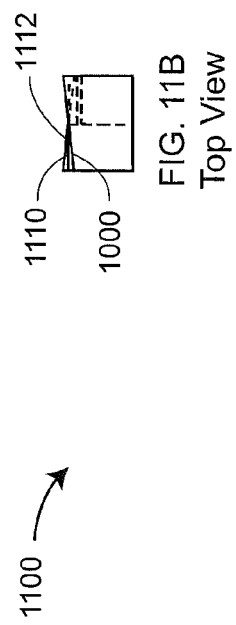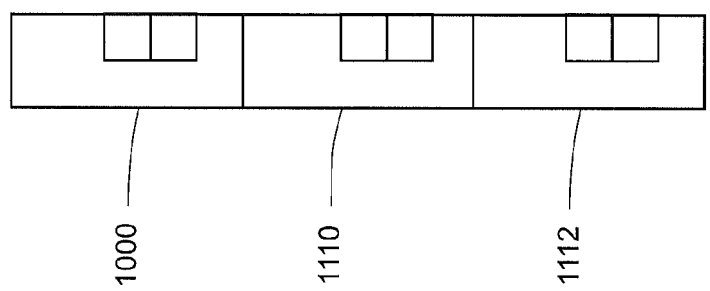

GRATING-BASED SCANNER WITH PHASE AND PITCH ADJUSTMENT

CROSS-REFERENCE TO RELATED APPLICATIONS

The present application claims the benefit of U.S. Provisional Patent Application No. 61/507,771, filed on Jul. 14, 2011, the contents of which are hereby incorporated by reference in their entirety.

BACKGROUND

The present disclosure relates to a coordinate measuring device. One set of coordinate measurement devices belongs to a class of instruments that measure the three-dimensional (3D) coordinates of a point by projecting a pattern of light to an object and recording the pattern with a camera.

A particular type of coordinate-measuring device, sometimes referred to as an accordion-fringe interferometer, forms the projected pattern of light by the interference of light of diverging wavefronts emitted by two small, closely spaced spots of light. The resulting fringe pattern projected onto the object is analyzed to find 3D coordinates of surface points for each separate pixel within the camera.

An implementation of an accordion fringe interferometer is one in which a diffraction grating is moved using piezoelectric actuator, a capacitive feedback sensor, a flexure stage, multiple laser sources, and multiple objective lenses. This type of accordion fringe interferometer is relatively expensive to manufacture and relatively slow in performing measurements. What is needed is an improved method of finding 3D coordinates.

SUMMARY OF THE INVENTION

A method for determining three-dimensional coordinates of a first point on a surface of an object includes the steps of: providing a first source, a projector, and a camera, the projector including a first diffraction grating, an objective lens, and a first plate, the camera including a camera lens and a photosensitive array, the first source producing a first source beam of light, the first plate containing a first transmissive region, a second transmissive region, and at least one opaque region, the projector having a projector perspective center, the camera having a camera perspective center, a line segment between the projector perspective center and the camera perspective center being a baseline, the baseline having a baseline length. The method also includes: sending the first source beam of light to the first diffraction grating; forming with the first diffraction grating at least a first diffracted beam of light and a second diffracted beam of light; sending the first diffracted beam of light and the second diffracted beam of light to the objective lens; forming with the objective lens at least a first spot of light and a second spot of light, the first spot of light arising from the first diffracted beam of light and the second spot of light arising from the second diffracted beam of light; placing the first plate in a first position near the first spot of light and the second spot of light. The method further includes: passing first light from the first spot of light through a first thickness of glass in the first transmissive region and passing second light from the second spot of light through a second thickness of glass in the second transmissive region while keeping other light from passing the first plate, a difference in the first thickness and the second thickness equal to a first thickness difference; combining the first light and the second light to produce a first fringe pattern on the surface of the object; imaging the first object point illuminated by the first fringe pattern onto an array point on a photosensitive array to obtain a first electrical data value from the photosensitive array; moving the first plate to a second position; passing third light from the first spot of light through a third thickness of glass in the first transmissive region and passing fourth light from the second spot of light through a fourth thickness of glass in the second transmissive region while keeping other light from passing the first plate, a difference in the third thickness and the fourth thickness equal to a second thickness difference, the second fringe difference not equal to the first fringe difference; combining the third light and the fourth light on the surface of the object to produce a second fringe pattern on the surface of the object, the first fringe pattern and the second fringe pattern having a first fringe pitch at the first object point; imaging the first object point illuminated by the second fringe pattern onto the array point to obtain a second electrical data value from the photosensitive array; calculating the three-dimensional coordinates of the first object point based at least in part on the first electrical data value, the second electrical data value, and the baseline length; and storing the three-dimensional coordinates of the first object point.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIGS. 4, 4A, and 4B are drawings showing a front view, first sectional view, and second sectional view, respectively, of a phase shifter and pinhole object;

FIGS. 10A-D are drawings that show front, first sectional, second sectional, and top views, respectively, of a phase and fringe adjuster window in accordance with an embodiment of the present invention; and FIGS. 11A and 11B are front and top views, respectively, of an assembly capable of adjusting phase and fringe pitch in accordance with an embodiment of the present invention.

DETAILED DESCRIPTION

Figure 1:
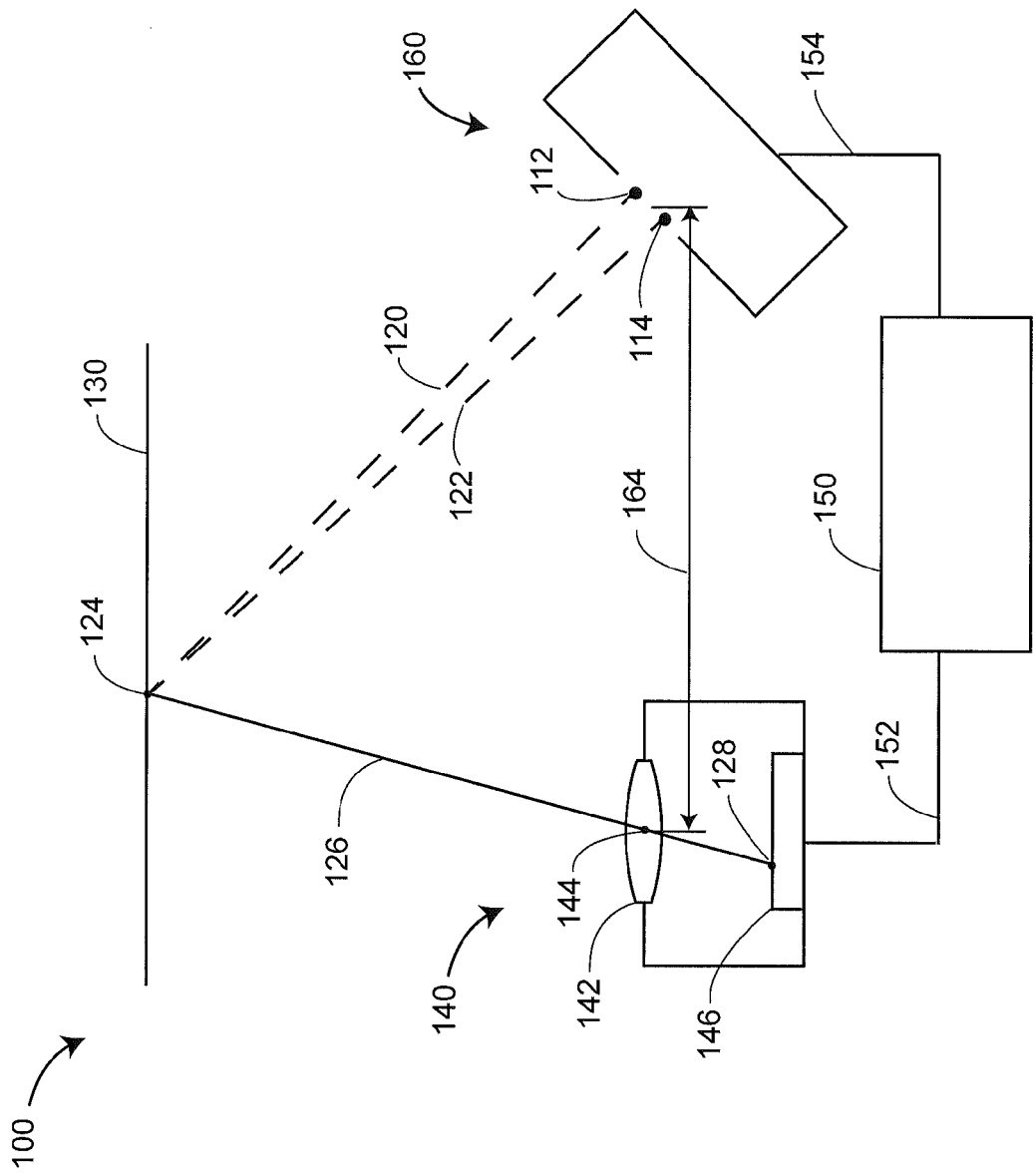
FIG. 1 is a schematic diagram illustrating the triangulation principle of operation of a 3D measuring device.

An exemplary 3D measuring device 100 that operates according to the principle of accordion fringe interferometry
} is shown in FIG. 1. A projector 160 under control of an electronics unit 150 produces two small spots of light 112, 114. These spots of light produce a pattern of fringes on the surface of a workpiece 130. The irradiance at a particular point 124 is determined by the interference of the two rays of light 120, 122 at the point 124. At various points on the surface of the workpiece 130, the light rays 120, 122 interfere constructively or destructively, thereby producing the fringe pattern. A camera 140 includes a lens system 142 and a photosensitive array 146. The camera 140 forms an image on photosensitive array 146 of the pattern of light on the workpiece 130. The light from the point 124 may be considered to pass through a perspective center 144 of a lens system 142 to form an image point 128 on the photosensitive array. A particular pixel 128 of the photosensitive array 146 receives light scattered from a small region 124 of the surface of the workpiece 130. The two angles that define the direction to this small region with respect to the perspective center 144 are known from the geometrical properties of the camera 140, including the lens system 142.

The light falling onto the photosensitive array 146 is converted into digital electrical signals, which are sent to electronics unit 150 for processing. The electronics unit 150, which includes a processor, calculates the distance from the perspective center 144 to each point on the surface of the workpiece 130. This calculation is based at least in part on a known distance 164 from the camera 140 to the projector 160. For each pixel in the camera 140, two angles and a calculated distance are known, as explained herein above. By combining the information obtained from all the pixels, a three dimensional map of the workpiece surface is obtained.

Figure 2:
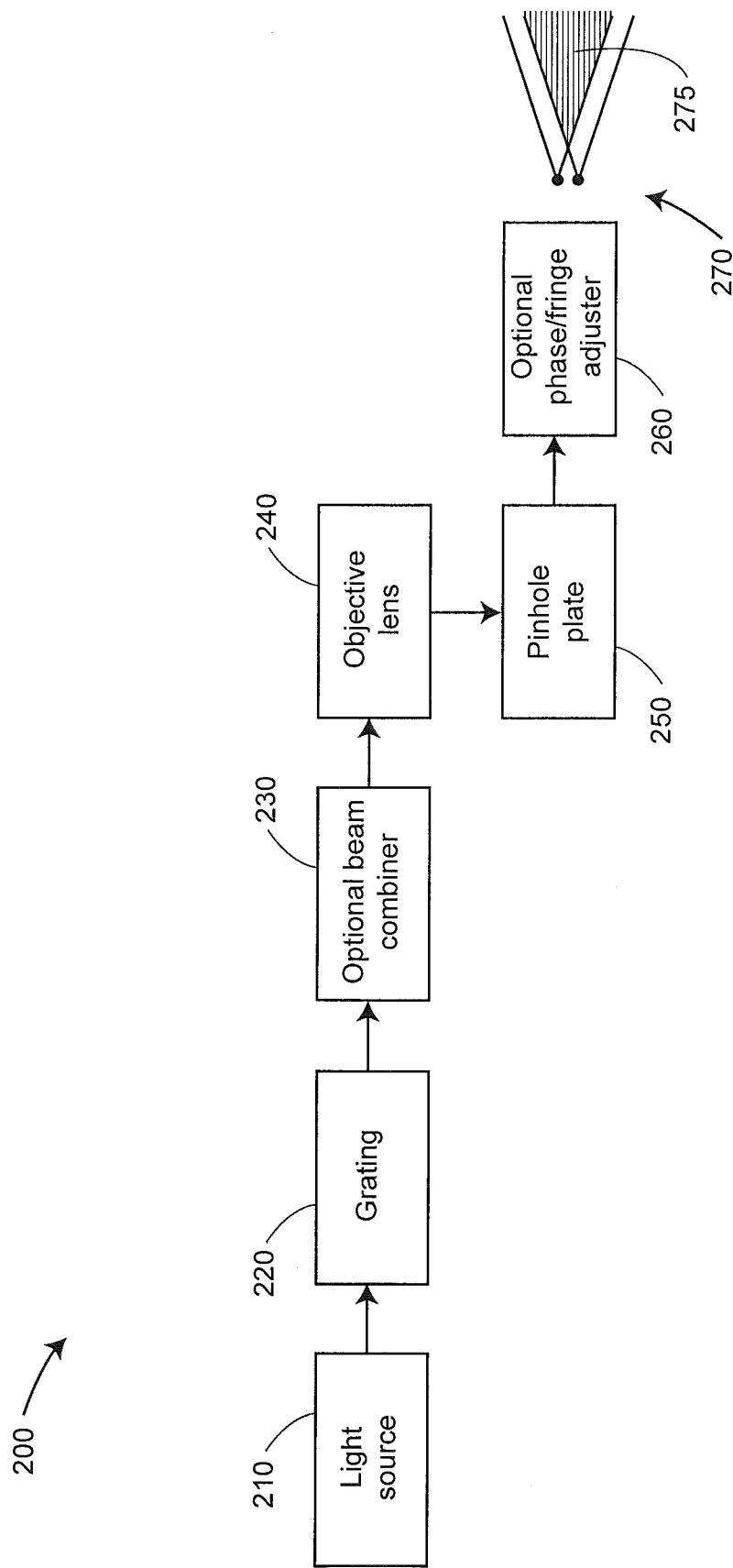
FIG. 2 is a block diagram showing elements of an exemplary projector in accordance with an embodiment of the present invention.

FIG. 2 shows the elements of an exemplary projector 200 according to an embodiment. A light source 210 sends light to a grating 220 that causes the light to split into multiple beams each traveling at a different angle. The grating may be blazed to maximize the size of the +1 and −1 orders generated in relation to other orders such as the 0, +3, −3, +5, −5 orders. If more than one light source and more than one grating are used, the light emanating from the more than one grating may be combined in a beam combiner 230. In an embodiment, the beam combiner 230 is a glass beam splitter. The beams of light are sent through an objective lens 240 that focuses the light into two small spots 270. The spots 270 may be real or virtual, the real spots formed by an objective lens system having a positive power and the virtual spots by an objective lens system having a negative power. A pinhole plate 250 has a region that allows the +1 and −1 orders of the light pass through while blocking the other orders. The pinhole plate is placed near the plane to which the spots 270 are focused. An optional phase/fringe adjuster 260 is also placed near the plane to which the spots 270 are focused. In an embodiment, the pinhole plate 250 and fringe/phase adjuster 260 are integrated into one optical component. Interference occurs in the overlap region 275 and is observed as fringes at points on a workpiece surface.

Figure 3:
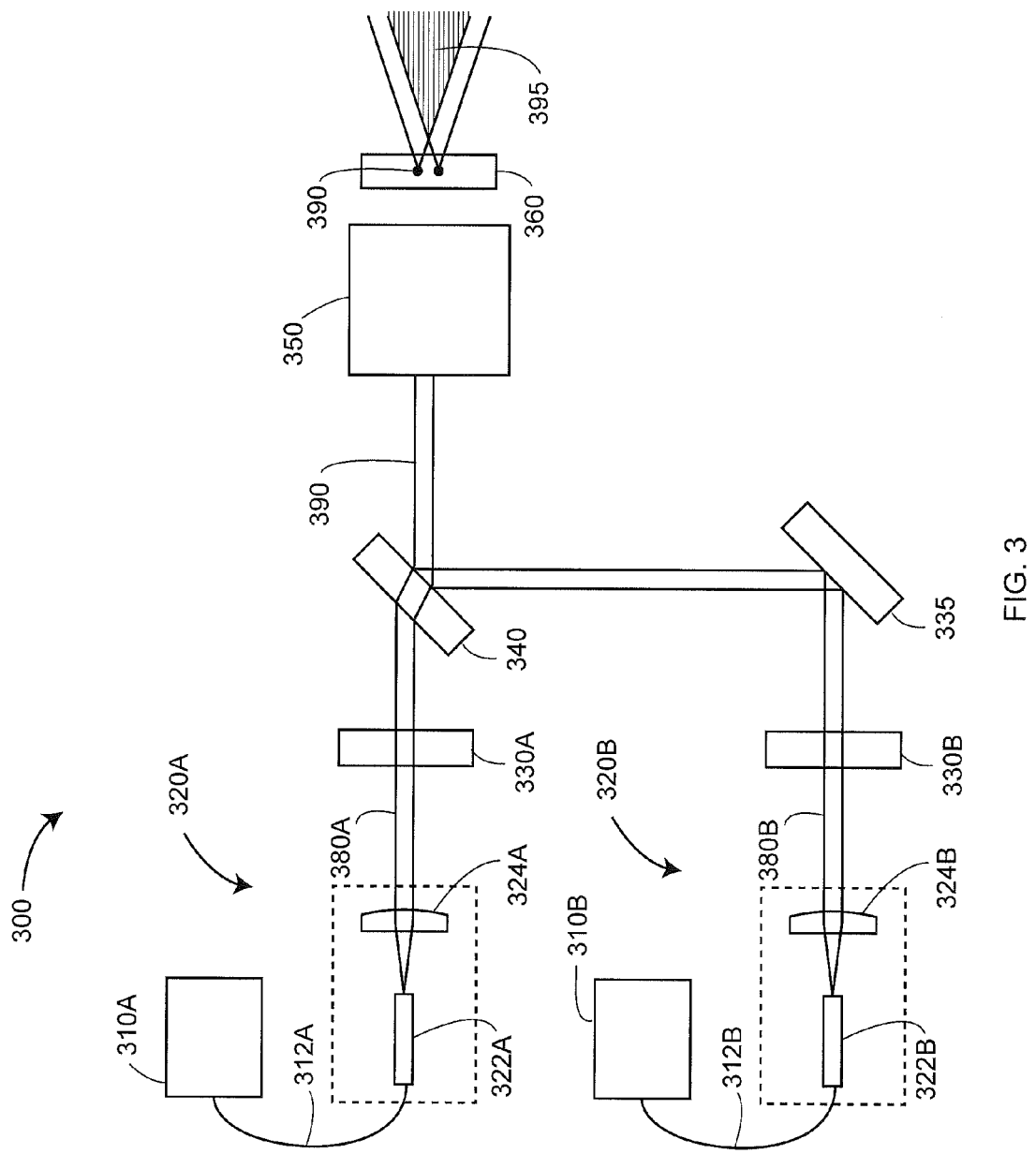
FIG. 3 is a schematic diagram showing the main elements of an exemplary projector in accordance with an embodiment of the present invention.

FIG. 3 shows specific elements of an exemplary projector 300 that contains elements corresponding to the generic elements of FIG. 2. Light source 310A provides light that might come from a laser, a superluminescent diode, LED or other source. In an embodiment, the light from the light source 310A travels through an optical fiber 312A to a fiber launch 320A that includes a ferrule 322A and a lens 324A. Alternatively, light from light source 310A may travel through free space to reach lens 324A. Collimated light 380A that leaves the fiber launch 320A passes through grating 330A, the grating producing beams of light that travel in different directions. The orders of light produced may include 0, ±1, ±3, and ±5. The light passes through beam splitter 340. In an embodiment, the beam splitter 340 is a non-polarizing beam splitter that transmits 50% of the light and reflects 50% of the light, so that half of the optical power is lost. In another embodiment, the light beams 380A, 380B are orthogonally polarized and the beam splitter 340 is a polarizing beam splitter configured to transmit nearly the entire light beam 380A and reflect nearly the entire light beam 380B. Light source 310B provides light that, in an embodiment, travels through an optical fiber 312B to a fiber launch 320B that includes a ferrule 322B and a lens 324B. Collimated light 380B that leaves the fiber launch 320B passes through grating 330B, the grating producing beams of light that travel in different directions. The light reflects off mirror 335 and reflects off beam splitter 340. The light transmitted through the beam splitter 340 and the light reflected by the beam splitter 340 travels along the same beam path 390. The light sources 322A, 322B are turned on one at a time so that there is no interference between the beams of light 380A, 380B as they exit the beam splitter 340.

The light beam traveling along the beam path 390 travels to an objective lens 350 that focuses the light into two small spots 290. An optical element 360 is placed near the two small spots 390. In an embodiment, the optical element 360 is a combination phase adjuster and pinhole plate. The pinhole plate blocks small spots created by beams that might be, for example, of orders 0, ±3, and ±5. The phase adjuster adjusts the phase, for example to phase values of 0, 120, and 240 degrees. Interference occurs in the overlap region 395 and is observed as fringes at points on a workpiece surface.

The method of calculating distances using accordion fringe interferometry according to the system 100 shown in FIG. 1 is to shift the relative phase of the two spots 112, 114, which has the effect of moving the fringes on the workpiece. Each pixel of the camera measures the level of light obtained from equal exposures for each of the three phase shifts. At least three measured light levels are used by the processor within the electronics unit 150 to calculate the distance to points on the surface of the workpiece. Therefore to calculate 3D coordinates, the systems shown in FIGS. 1-3 need the ability to shift the relative phases of the points 112, 114, the points 270, and the points 390, respectively.

If the range of distances measured by the scanner is relatively large, it will also need the ability to resolve ambiguities in the measured distances. Because the fringe pitch is relatively small, it turns out that there are several possible valid distance solutions based on the images collected by the camera. This ambiguity can be removed by changing the spacing (pitch) between fringes by a known amount. In the embodiment of FIG. 3, two different fringe spacings are obtaining by using two sources of light that pass through two corresponding gratings 330A, 330B, the gratings 330A, 330B having different pitch values. To calculate 3D coordinates, the systems shown in FIGS. 1-3 in most cases need the ability to change the fringe pitch to at least two values.

Figure 4:
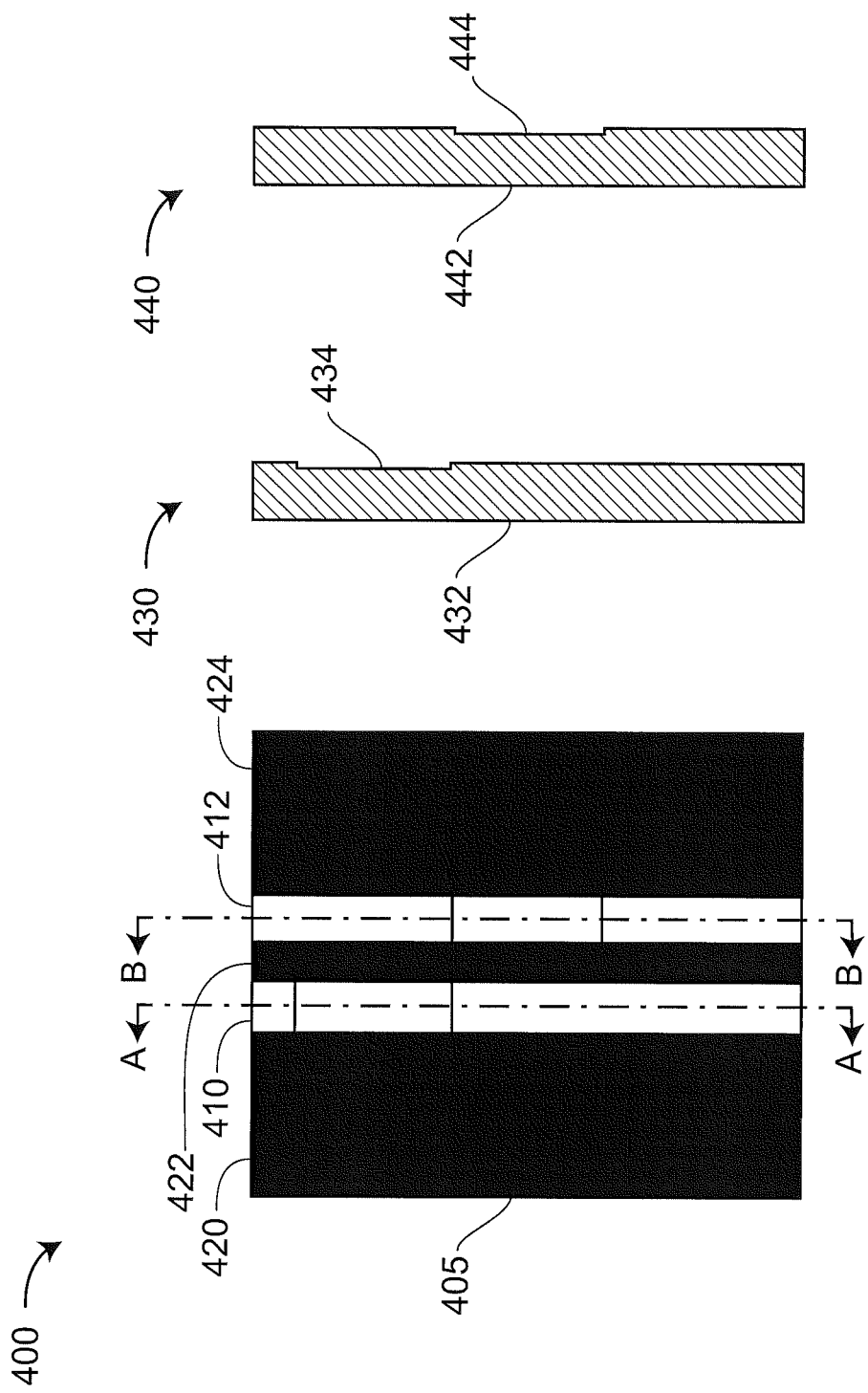

In an embodiment, the combination pinhole and phase shifter 360 is the optical element 400 shown in FIG. 4. The optical element 400 includes a glass plate 405 made of a high quality material such as fused silica. Regions are etched into the glass in a pattern that produces three different relative phase shifts in light passing through the striped areas 410 and 412. Alternatively, different thicknesses may be created by applying coatings of varying thickness over the glass plate 405. If coatings are used, care should be taken to minimize differences in the amount of light transmitted by each different layer as differences in transmitted power can cause errors in the calculated distances. In an exemplary embodiment shown in FIG. 4, the striped area 410 has a recessed section 432 as shown in section A-A, and the striped area 412 has a recessed section 444 as shown in section B-B. The light passing through striped areas 410 and 412 have three different relative optical path lengths (OPLs), according to the vertical position on the optical element 400 through which the light passes. These three different OPLs produce three different relative phase shifts of the spots of light 390. On the workpiece, the effect of this phase shift will be a sideways shift of the fringe lines. Many other etched patterns are possible to obtain three different phase shifts. In addition, in some cases, it may be desirable to obtain more than three phase shifts so that additional etched regions may be needed. It should be understood that the pattern shown in FIG. 4, 4A, 4B are simply suggestive and not limiting in terms of the types of patterns that might be used.

The pinhole function of the optical element 400 is to block unwanted light having orders other than ±1. The order 0 is blocked by an opaque coating 422, which might be a chrome coating. The orders ±3, ±5 are blocked by the opaque regions 420, 424. In an embodiment, the regions 420, 422, and 424 are in the form of stripes rather than true pinholes. The term pinhole is commonly used to describe the function of blocking unwanted beams and so is used here, even though a striped form of the beam blocker is used in the illustrated embodiment. Other patterns of opaque and transparent regions may be applied to the optical element 400.

Figure 5:
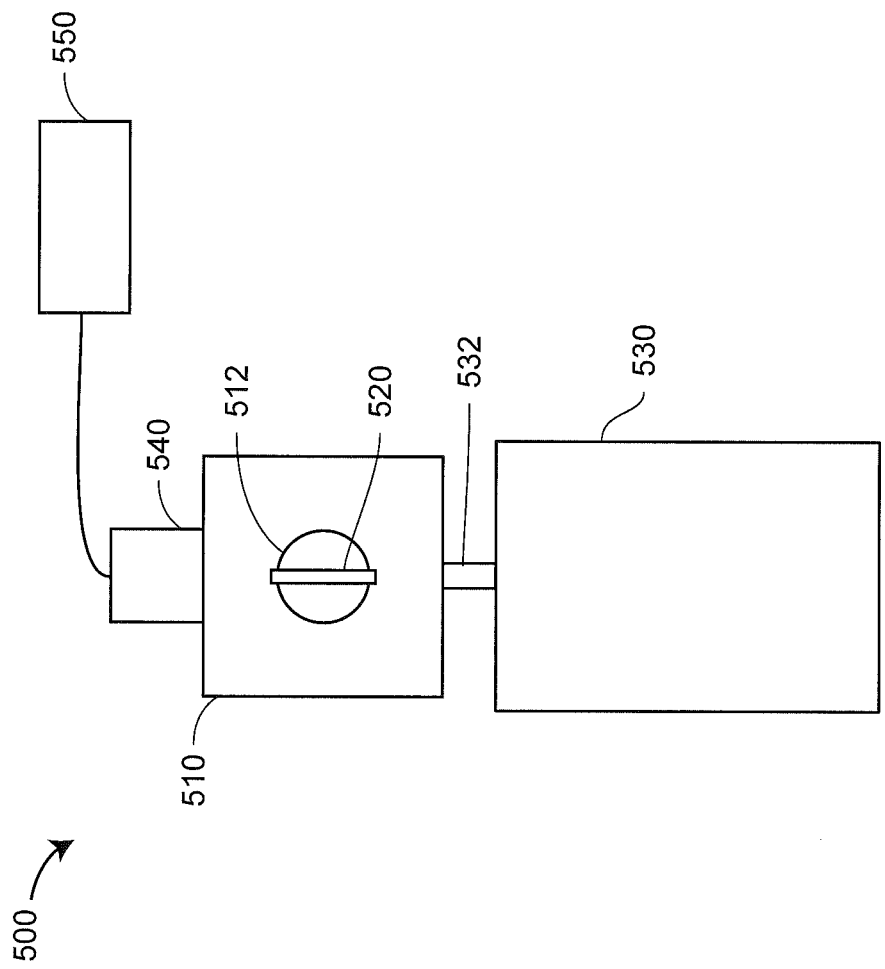
FIG. 5 is a schematic drawing showing elements of a motorized stage that moves a phase/fringe adjuster in accordance with an embodiment of the present invention.

A motorized mechanism 500 shown in FIG. 5 can be used to provide linear motion to the phase adjuster 400 of FIG. 4. The stage 500 includes a ball slide with a hole at its center. Commercially available ball slides of this type have a specified straightness of 0.00008 m/m. A phase/fringe adjuster, which might be for example adjuster 400, is attached to position 520. Motion is provided by an actuator 530, which in an embodiment is a voice coil actuator. The actuator 530 pushes a driver element 532 to move the ball slide. Position feedback is provided by a sensor 540, which in an embodiment is a linear encoder. Electronics unit 550 provides electronics support for the actuator 530 and feedback sensor 540. Electronics unit 550 may contain a processor to provide computational support.

Figure 6:
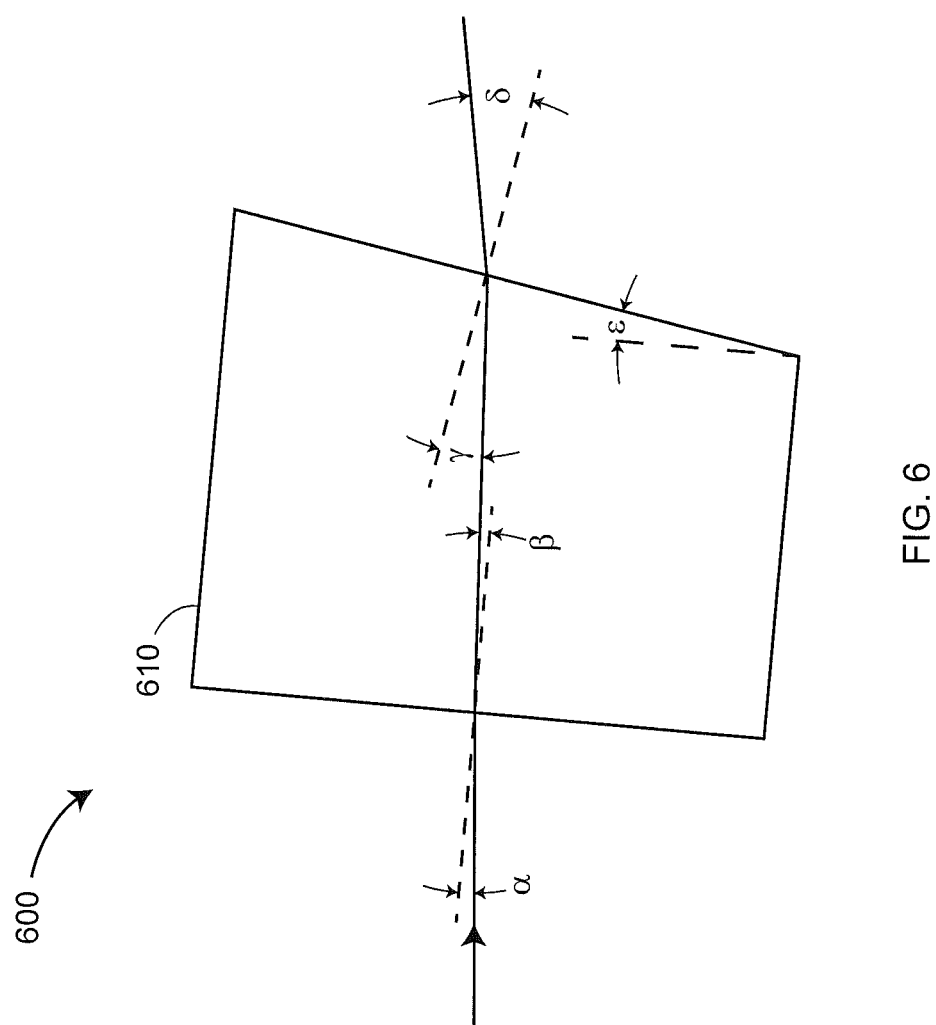
FIG. 6 is a drawing that shows the geometry of a ray of light passing through a tilted and wedged window.

A method for changing fringe pitch is now considered. FIG. 6 shows the geometry of a ray of light traveling through a wedged window 600 having a wedge angle $\epsilon$ and an angle of incidence $\alpha$ at the first surface 612. The wedged window 600 has a first angle of refraction $\beta$, a second angle of incidence $\gamma$, and a second angle of refraction $\delta$. We are interested in finding the angle of the final ray leaving the wedged window with respect to the initial ray entering the wedged window. In particular, we are interested in how this angular change varies with the angle of incidence $\alpha$ for the case in which $\alpha$ is close to zero.

The change in the beam angle at the first interface is $\beta-\alpha$, and the change in the beam angle at the second interface is $\gamma-\delta$. The second angle of incidence is given by $$\gamma+\beta\epsilon, \quad (1)$$

and the total change $\zeta$ in beam angle is $$\zeta=\beta-\alpha+\delta-\gamma=-\alpha+a\sin(n\sin(\gamma))-\epsilon, \quad (2)$$

For an angle of incidence $\alpha=0$, Eq. (2) simplifies to $$\zeta=a\sin(n\sin(\epsilon))-\epsilon. \quad (3)$$

Eq. (3) can be used to calculate the desired wedge angle. For example, if the index of refraction of the glass is n=1.5 and if the desired angle of deviation is $\zeta$=1.3 milliradians, Eq. (3) can be solved numerically to find the wedge angle $\epsilon$=2.5 milliradians.

Figure 7:
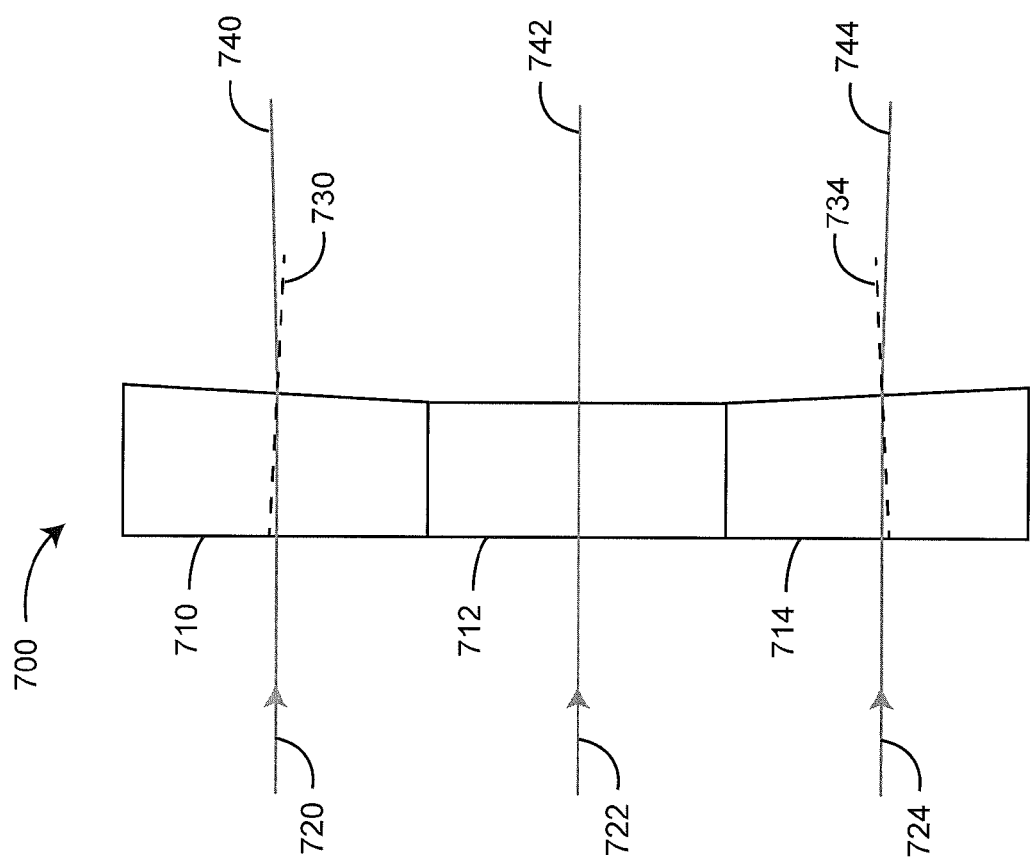
FIG. 7 is a drawing showing the geometry of rays of light passing through an assembly that includes three wedged windows in accordance with an embodiment of the present invention.

To produce three different angles that give the desired distances between the spots at the output of a 3D measurement device, an arrangement of wedged windows can be combined in an assembly 700 as shown in FIG. 7. The main direction of each beam is set by a grating element as explained below with reference to FIG. 9 discussed below. The purpose of the assembly 700 is to make small changes in the angles between the two separated beams to produce desired small changes in fringe pitch. This is conveniently done by placing an unwedged window 712 in the center of the assembly and placing oppositely angled wedged windows 710 and 714 on either side.

To produce the desired angles of deviation, the assembly 700 of FIG. 7 is moved up and down in the plane of the paper. This will produce a consistent angular deviation in each of the three elements 710, 712, and 714, but there will be a different phase shift in each case, and this phase shift will depend on the position of the assembly 1200 in its up and down movement.

Figure 8A:
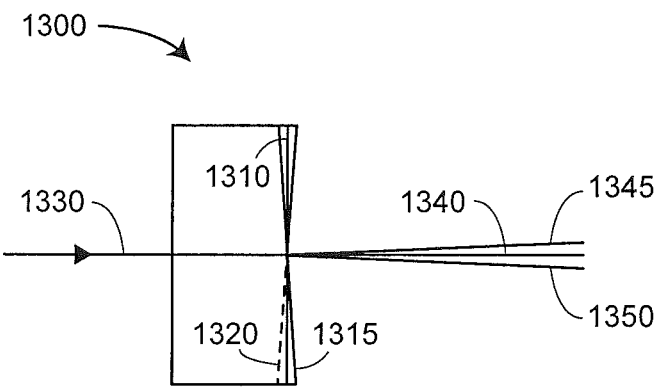
FIG. 8 is a drawing showing the geometry of rays of light passing through an assembly that includes three wedged windows in accordance with an embodiment of the present invention.
Figure 8B:
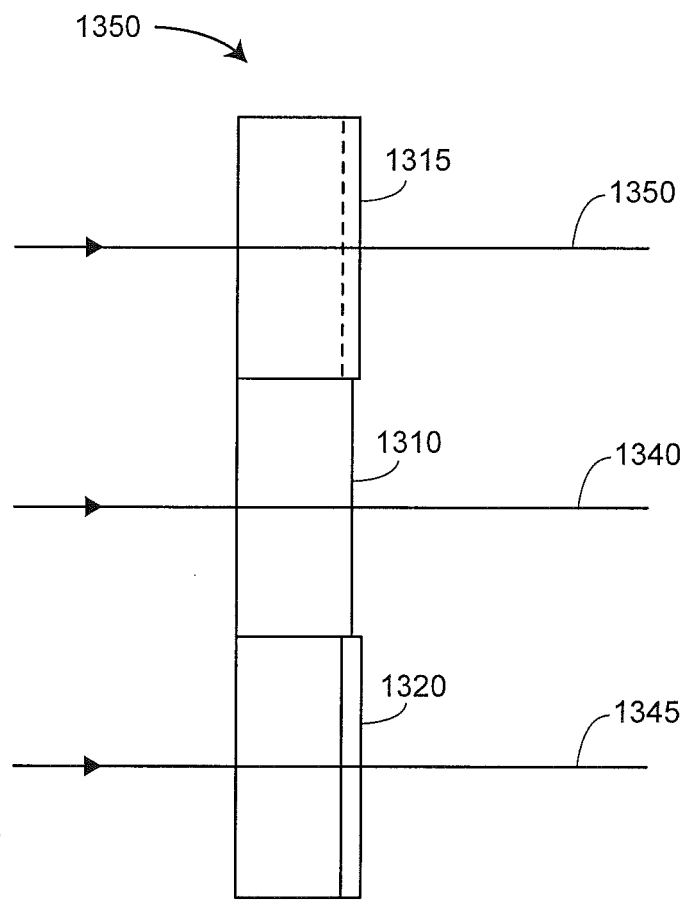

To avoid an undesirable shift in phase with variations in the thickness of the glass as the assembly is moved, the wedges may be arranged as in assembly 1300, 1350 of FIGS. 8A, 8B. When seen in the top view of FIG. 8A, the assembly extends out of the plane of the paper. A single beam 1330 enters one of the three sections 1310, 1315, 1320. The wedge angle of the glass section 1315, 1311, 1320 determines the direction of the exiting beams of light 1340, 1350, 1345, respectively. For the beam 1330 entering the unwedged section 1310, the beam 1340 leaves the assembly along the original direction. For the other two sections 1315, 1320, the beam is bent toward the leading edge of the glass, in accordance with FIG. 6. An important aspect of the design of the assembly 1300 (1350) is that the phase of the beam does not change in any one of the sections 1310, 1315, 1320 as the assembly is moved along. This is true as long as the sections 1310, 1315, 1320 are properly aligned so that the glass thickness does not change during movement.

Figure 9:
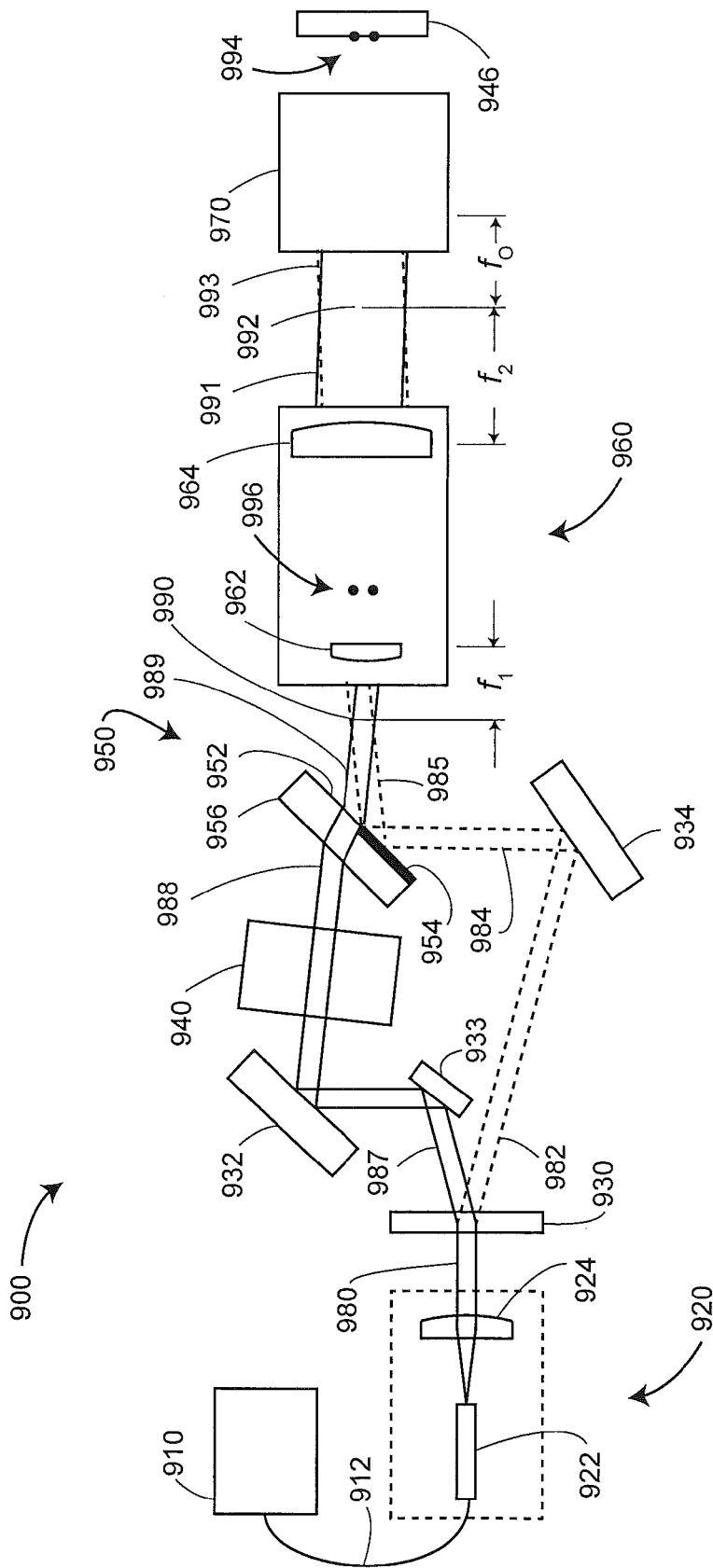
FIG. 9 is a schematic diagram showing the elements of an assembly that changes phase and fringe pitch using a single element.

An arrangement that uses a single optical element to adjust both phase and fringe pitch is shown in FIG. 9. Light source 910 provides light that might come from a laser, a superluminescent diode, LED or other source. In an embodiment, the light from the light source 910 travels through an optical fiber 912 to a fiber launch 920 that includes a ferrule 922 and a lens 924. Alternatively, light from light source 910 may travel through free space to reach lens 924. Collimated light 980 leaving the fiber launch 920 travels to grating 930 which splits the light into a several beams of light traveling in different directions. Later in the optical path all of the different orders of diffracted light are focused into spots, all of which, except for the ±1 orders, are removed by an opaque mask. The beam 987 reflects off mirror 933, reflects off mirror 932, and passes through phase/fringe adjuster 940 that adjusts both phase and fringe spacing at the output of the assembly 900. The light passes through a first portion of a beam combiner 952 that transmits the light.

The light 982 reflects off mirror 934 and reflects off a second region 954 of beam combiner 956. The two beams of light 985, 989 that emerge from beam combiner 956 intersect at position 990. An afocal beam expander 960, which in an embodiment includes two positive lens elements 962, 964, is positioned so that the focal length of the first lens element 962 is placed a distance equal to the focal length $f_1$ of the first lens element 962 away from the intersection point 990. The two collimated beams of light 985, 989 are focused by the first lens element 962 to two spots of light 996 at a distance $f_1$ from the first lens 962. The distance between the lenses 962 and 964 is equal to $f_1+f_2$ so that the two spots within the beam expander are a distance $f_2$ from the second lens element 962. Two collimated beams of light 991, 993 emerge from the beam expander 960. The size of the emerging beams 991, 993 equals the transverse magnification M of the beam expander times the size of the incident beams, where the magnification is $M=f_2/f_1$. The angle between the two emerging laser beams is reduced by a factor of 1/M compared to the angle between the incident laser beams 991, 993. As an example, suppose that the diameter of each incident laser beam 985, 989 is 0.7 mm, with the beams having a separation angle of 13 milliradians (mrad). Also suppose that the transverse magnification of the beam expander 960 is M=10. The emerging laser beams 991, 993 then each have a diameter of 7 mm and an angle of separation of 1.3 mrad. The collimated beams of light 991, 993 emerging from the beam expander 960 intersect at position 992. The objective lens 970, which might be a 40× microscope objective having a focal length of $f_O$=4.5 mm and a numerical aperture of NA=0.65, for example, is placed so that the distance from the front focal position of the objective lens 970 from the intersection point 992 is equal to the focal length $f_O$ of the objective lens 970. The objective lens 970 focuses the collimated beams 991, 993 into two small spots 994. A pinhole plate 946, which includes alternating opaque and transparent stripes, is positioned near the spots 994 to block all orders of diffracted light from the grating 930 except for the +1 and −1 orders. In an alternative embodiment, a plate at the position of the spots 996 contain alternating stripes of opaque and transparent regions to block all orders of light diffracted by the grating except for the +1 and −1 orders.

FIG. 10 shows a phase/fringe adjuster 1000 that may be used as the element 940 in FIG. 9. The phase/fringe adjuster 1000 includes a glass wedged window that has an entrance face not parallel to an exit face. In the adjuster 1000, the face 1012 is not parallel to the face 1020. In addition, the phase/fringe adjuster 1000 includes two small sections 1014, 1016 etched into the glass. The difference in the optical path length (OPL) between the top area 1012 and either of the two sections 1014, 1016 is equal to the difference in thickness between the top area 1012 and the section multiplied by the quantity n−1, where n is the index of refraction of the glass. The corresponding phase shift is equal to the difference in OPL multiplied by $2\pi/\lambda$, where $\lambda$ is the wavelength of light from the light source. So, for example, for a wavelength of 658 nm, an index of refraction of n=1.5, and a first desired phase shift of 120 degrees=$2\pi/3$ radians, the section 1014 should be etched to a depth d of d=$\lambda/3(n-1)$=658 nm/3(1.5−1)=438.7 nm. If a 240 degree phase shift is desired for the section 1016, the etching depth should be doubled to 877.3 nm. An alternative approach to etching the glass to a given depth is to coat the glass to a given height at the desired sections.

To obtain three different fringe pitches, three glass windows can be stacked, as shown in FIGS. 11A, 11B. A simple way to combine three wedged elements in an assembly is to set the central element to have a wedge angle of zero (parallel entrance and exit surfaces) and the two outside windows to have equal, but oppositely directed, wedge angles.

As an example, suppose that the desired separations of the spots 994 in FIG. 9 are a={46, 52, 58} micrometers. If the focal length of the objective lens 970 is 4.5 mm, then the angles of separation between the beams 991, 993 are θ=a/$f_O$={10.22, 11.56, 12.89} milliradians. If the transverse magnification of the beam expander 996 is M=10, the angles of separation between the beams 985, 989 are {102.2, 115.6, and 128.9} milliradians. The mirrors 932, 934 are set to produce an angular separation between the beams 985, 989 of 115.6 milliradians when the beam 987 passes through the central window 1110 of the phase/fringe adjuster 940. In this case, the central window 1110 has a wedge angle of zero; in other words, it is a window with parallel sides. The windows 1000 and 1112 are manufactured to have a wedge angle equal to 128.89−115.56=115.55−102.22=13.3 milliradians. The wedged windows 1000, 1112 are mounted in opposite directions so that the wedge angles of +13.3 milliradians deflect the beam of light in opposite directions.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for determining three-dimensional coordinates of a first object point on a surface of an object, the method comprising steps of:

providing a first source, a projector, and a camera, the projector including a first diffraction grating, an objective lens, and a first plate, the camera including a camera lens and a photosensitive array, the first source producing a first source beam of light, the first plate containing a first transmissive region, a second transmissive region, and at least one opaque region, the at least one opaque region formed with a coating placed on a surface of the first plate, the projector having a projector perspective center, the camera having a camera perspective center, a line segment between the projector perspective center and the camera perspective center being a baseline, the baseline having a baseline length;

sending the first source beam of light to the first diffraction grating;

forming with the first diffraction grating at least a first diffracted beam of light, a second diffracted beam of light, and a residual light, the residual light being light from the first source beam of light that passes through the first diffraction grating and that is other than the first diffracted beam of light or the second diffracted beam of light;

sending the first diffracted beam of light, the second diffracted beam of light, and the residual light to the objective lens;

forming with the objective lens at least a first spot of light and a second spot of light, the first spot of light arising from the first diffracted beam of light and the second spot of light arising from the second diffracted beam of light;

placing the first plate in a first position near the first spot of light and the second spot of light;

passing first light from the first spot of light through a first thickness of glass in the first transmissive region and passing second light from the second spot of light through a second thickness of glass in the second transmissive region while blocking, with the at least one opaque region, the residual light from passing the first plate, wherein a difference in the first thickness and the second thickness is equal to a first thickness difference;

combining the first light and the second light to produce a first fringe pattern on the surface of the object;

imaging the first object point illuminated by the first fringe pattern onto an array point on a photosensitive array to obtain a first electrical data value from the photosensitive array;

moving the first plate to a second position;

passing third light from the first spot of light through a third thickness of glass in the first transmissive region and passing fourth light from the second spot of light through a fourth thickness of glass in the second transmissive region while blocking, with the at least one opaque region, the residual light from passing the first plate, wherein a difference in the third thickness and the fourth thickness is equal to a second thickness difference, the second thickness difference not equal to the first thickness difference;

combining the third light and the fourth light on the surface of the object to produce a second fringe pattern on the surface of the object, the first fringe pattern and the second fringe pattern having a first fringe pitch at the first object point;

imaging the first object point illuminated by the second fringe pattern onto the array point to obtain a second electrical data value from the photosensitive array;

calculating the three-dimensional coordinates of the first object point based at least in part on the first electrical data value, the second electrical data value, and the baseline length; and storing the three-dimensional coordinates of the first object point.

2. The method of claim 1, wherein in the step of providing a first source, a projector, and a camera, the first source beam of light is selected from the group consisting of visible light, infrared light, and ultraviolet light.

3. The method of claim 1, further comprising steps of:

moving the first plate to a third position;

passing fifth light from the first spot of light through a fifth thickness of glass in the first transmissive region and passing sixth light from the second spot of light through a sixth thickness of glass in the second transmissive region while blocking, with the at least one opaque region, the residual light from passing the first plate, wherein a difference in the fifth thickness and the sixth thickness is equal to a third thickness difference, the third fringe difference not equal to the first fringe difference or the second fringe difference;

combining the fifth light and the sixth light on the surface of the object to produce a third fringe pattern on the surface of the object, the third fringe pattern having a first fringe pitch at the first object point;

imaging the first object point illuminated by the third fringe pattern onto the array point to obtain a third electrical data value from the photosensitive array, wherein the calculating the three-dimensional coordinates of the first object point is further based on the third electrical data value.

4. The method of claim 1, further comprising a step of sending the first diffracted beam of light through a first transparent wedge having a first wedge angle to change the direction of propagation of the first diffracted beam of light prior to sending it through the objective lens, the first transparent wedge configured to produce the first pitch at the first object point.

5. The method of claim 4, further comprising a step of sending the first diffracted beam of light through a second transparent wedge having a second wedge angle to change the direction of propagation of the first diffracted beam of light prior to sending it through the objective lens, the second wedge angle different than the first wedge angle, the second transparent wedge configured to produce a second pitch at the first object point, the second pitch different than the first pitch.

6. The method of claim 1, further comprising steps of:

providing a second source, a second diffraction grating, and a beam combiner, the second source producing a second source beam of light;

sending the second source beam of light to the second diffraction grating;

forming with the second diffraction grating at least a third diffracted beam of light and a fourth diffracted beam of light;

sending the third diffracted beam of light and the fourth diffracted beam of light to the beam combiner;

sending the third diffracted beam of light and the fourth diffracted beam of light from the beam combiner to the objective lens;

forming with the objective lens at least a third spot of light and a fourth spot of light, the third spot of light arising from the third diffracted beam of light and the fourth spot of light arising from the fourth diffracted beam of light;

passing first light from the first spot of light and second light from the second spot of light to the surface of the object;

combining the first light and the second light to produce a fourth fringe pattern on the surface of the object;

imaging the first object point illuminated by the fourth fringe pattern onto an array point on a photosensitive array to obtain a fourth electrical data value from the photosensitive array, wherein the calculating the three-dimensional coordinates of the first object point is further based on the fourth electrical data value.

7. The method of claim 1, further comprising steps of:

providing a magnification lens system, the magnification lens system being an afocal lens system having a transverse magnification greater than one; and sending the first diffracted beam of light and the second diffracted beam of light through the magnification lens system before sending it through the objective lens.

* * * * *